United States Patent
Talley et al.

(10) Patent No.: US 7,903,599 B1
(45) Date of Patent: Mar. 8, 2011

(54) CALL-DETECTION ALGORITHM FOR MITIGATING INTERFERENCE BY LOW-COST INTERNET-BASE-STATION (LCIB) PILOT BEACONS WITH MACRO-NETWORK COMMUNICATIONS

(75) Inventors: Ryan S. Talley, Overland Park, KS (US); Bryan T. Barbee, Olathe, KS (US); Timothy W. Sill, Platte City, MO (US); John W. Prock, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 696 days.

(21) Appl. No.: 11/854,511

(22) Filed: Sep. 12, 2007

(51) Int. Cl.
*H04B 7/185* (2006.01)
*H04W 4/00* (2009.01)

(52) U.S. Cl. .......................... 370/318; 370/317; 370/328

(58) Field of Classification Search .................. 370/310, 370/311, 317, 318, 328, 329, 330, 331, 332, 370/333, 334, 335, 336, 337, 338; 455/403, 455/21, 500, 501, 522, 63.1, 67.11, 67.13, 455/114.24; 709/223, 224; 375/224, 227, 375/295, 296, 297
See application file for complete search history.

(56) References Cited

U.S. PATENT DOCUMENTS

| | | | |
|---|---|---|---|
| 4,996,715 A | 2/1991 | Marui et al. | |
| 5,634,191 A | 5/1997 | Beasley | |
| 5,767,778 A | 6/1998 | Stone et al. | |
| 5,832,365 A | 11/1998 | Chen et al. | |
| 5,937,332 A | 8/1999 | Karabinis | |
| 6,125,279 A | 9/2000 | Hyziak et al. | |
| 6,141,531 A | 10/2000 | Williams et al. | |
| 6,167,240 A | 12/2000 | Carlsson et al. | |
| 6,219,540 B1 | 4/2001 | Besharat et al. | |
| 6,404,775 B1 | 6/2002 | Leslie et al. | |
| 6,456,652 B1 | 9/2002 | Kim et al. | |
| 6,493,537 B1 | 12/2002 | Ogawa | |
| 7,035,587 B1 | 4/2006 | Yarkosky | |
| 7,088,959 B2 | 8/2006 | Ho et al. | |
| 2002/0068534 A1 | 6/2002 | Ue et al. | |
| 2003/0119460 A1 | 6/2003 | Zipper | |
| 2004/0204097 A1 | 10/2004 | Scheinert et al. | |
| 2005/0148368 A1 | 7/2005 | Scheinert et al. | |
| 2007/0042799 A1 | 2/2007 | Jubin et al. | |

(Continued)

OTHER PUBLICATIONS

Unpublished U.S. Appl. No. 11/854,5074, filed Sep. 12, 2007 in the name of Talley et al.

(Continued)

*Primary Examiner* — Aung S Moe
*Assistant Examiner* — Feben Haile

(57) ABSTRACT

Methods and systems are provided for mitigating interference by low-cost Internet-base-station (LCIB) pilot beacons with macro-network communications. In an embodiment, an LCIB transmits a pilot beacon having a power level that is adjustable on a per-carrier basis. The LCIB determines that it does not have any registered mobile stations, and responsively turns the power level down or off while monitoring reverse-noise rise (RNR) on one or more carriers. The LCIB then detects a threshold RNR on a carrier, and responsively carries out a sub-process a first number of times on the carrier. The sub-process comprises (a) gradually increasing the power level while continuing to monitor RNR, (b) detecting a sudden RNR decrease, and responsively turning the power level down or off while continuing to monitor RNR, and then (c) detecting an RNR increase. The LCIB waits for the RNR to return to normal before increasing the power.

20 Claims, 4 Drawing Sheets

U.S. PATENT DOCUMENTS

| | | | |
|---|---|---|---|
| 2007/0054670 A1 | 3/2007 | Kalika et al. | |
| 2008/0188265 A1 | 8/2008 | Carter et al. | |
| 2009/0005043 A1 | 1/2009 | Claussen et al. | |
| 2009/0104912 A1* | 4/2009 | Foster et al. | 455/446 |
| 2009/0111499 A1 | 4/2009 | Bosch et al. | |
| 2009/0135754 A1* | 5/2009 | Yavuz et al. | 370/311 |
| 2010/0048212 A1 | 2/2010 | Yavuz et al. | |

OTHER PUBLICATIONS

Wan Choi, et al., "Automatic On-Off Switching Repeater for DS/CDMA Reverse Link Capacity Improvement," IEEE Communications Letters, vol. 5, No. 4, Apr. 2001, pp. 138-141.

Office Action from U.S. Appl. No. 10/097,415, dated Jun. 21, 2004.

Non-Final Office Action from U.S. Appl. No. 10/222,015, mailed Mar. 24, 2005.

Final Rejection from U.S. Appl. No. 10/222,015, mailed Jul. 29, 2005.

Unpublished U.S. Appl. No. 11/940,159, filed Nov. 14, 2007 entitled "Low-Cost-Internet-BaseStation-(LCIB) User-Adaptation Algorithm".

Unpublished U.S. Appl. No. 12/129,425, filed May 29, 2008 entitled "Low-Cost Internet-BaseStation (LCIB) Radio-Frequency (RF) Adaptation Using Stationary Transceivers".

Unpublished U.S. Appl. No. 12/190,567, filed Aug. 12, 2008 entitled "Manually Configuring Low-Cost Internet-Base-Station (LCIB) Coverage Using an Associated Mobile Station".

Non-Final Office Action from U.S. Appl. No. 11/854,504 mailed Sep. 28, 2010.

* cited by examiner

CALL-DETECTION ALGORITHM FOR MITIGATING INTERFERENCE BY LOW-COST INTERNET-BASE-STATION (LCIB) PILOT BEACONS WITH MACRO-NETWORK COMMUNICATIONS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1 xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for call detection to mitigate interference by LCIB pilot beacons with macro-network communications. In one aspect, an exemplary embodiment may take the form of a method for an LCIB to reduce interference with communications between mobile stations and macro-network base stations, each macro-network base station providing service on at least one carrier. According to the method, an LCIB that transmits a pilot beacon on each carrier in a set of one or more carriers is provided, the pilot beacon having a power level that is adjustable on a per-carrier basis. The LCIB determines that it does not have any mobile stations registered thereon, and responsively (a) sets the power level to a first low-power setting on each carrier in the set and (b) monitors reverse-noise rise (RNR) on each carrier in the set.

While monitoring the RNR on a first carrier in the set, the LCIB detects that the RNR on the carrier exceeds a first threshold, and responsively carries out a sub-process a first number of times on the carrier. The sub-process comprises (a) gradually increasing the power level while continuing to monitor the RNR, (b) while gradually increasing the power level, detecting a decrease in the RNR that exceeds an RNR-decrease threshold, and responsively setting the power level to a second low-power setting while continuing to monitor the RNR, and (c) after setting the power level to the second low-power setting, detecting an increase in the RNR that exceeds an RNR-increase threshold. After carrying out the sub-process the first number of times on the carrier, the LCIB waits for the RNR on the carrier to fall below a second threshold before increasing the power level on the carrier above the second low-power setting.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
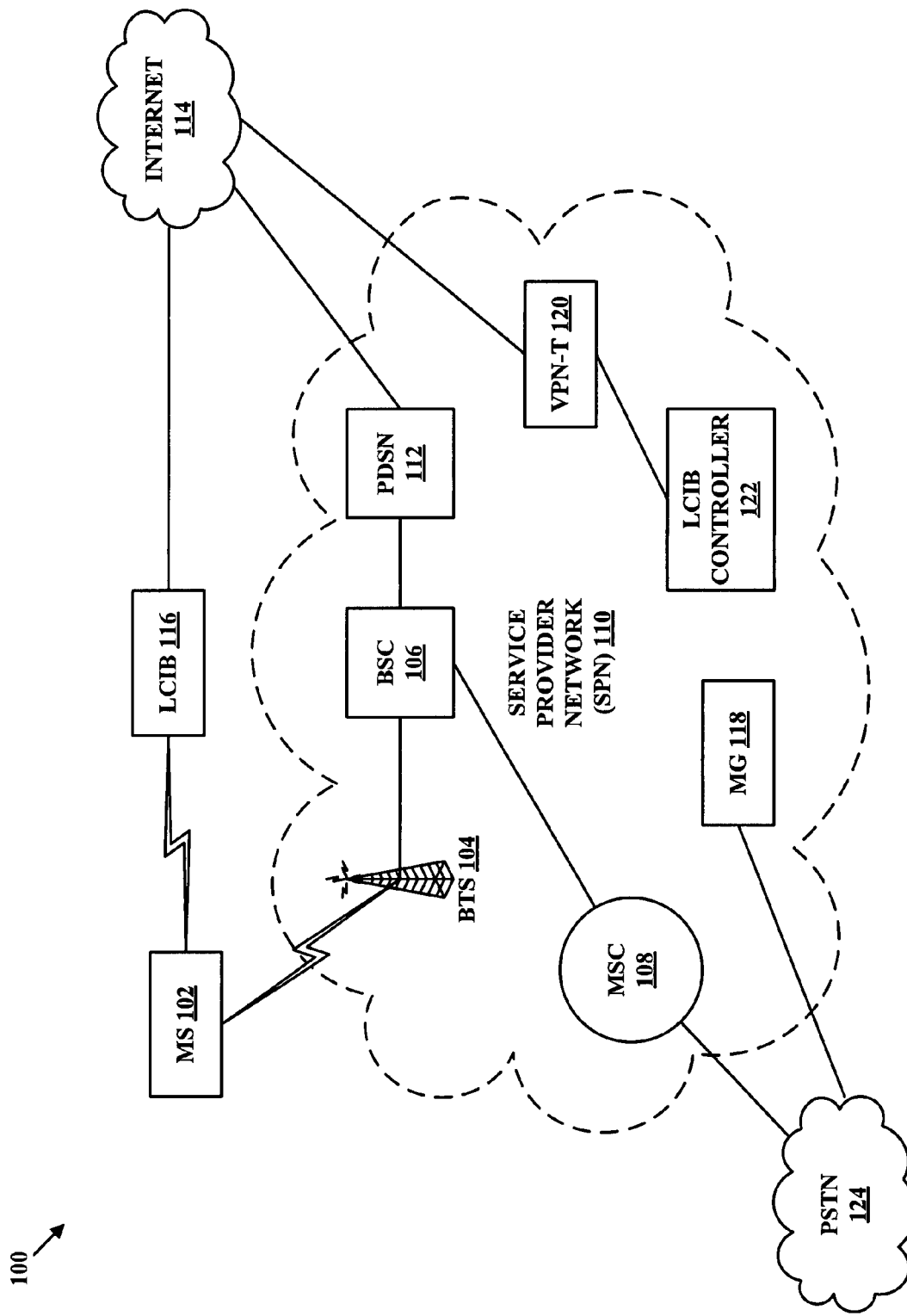
FIG. 1 is a simplified block diagram of a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a house, and so on. And along with limited transmission power, LCIBs are also designed to have a relatively low capacity for serving mobile stations. For example, an LCIB may provide a single CDMA carrier and have the capacity (e.g. channel elements) to provide service to up to five mobile stations at any given time, though any suitable number of channel elements (and/or carriers) may be used in a given implementation.

As described, LCIBs typically emit a pilot beacon that includes administrative messages and parameters that mobile stations can use to facilitate handoffs from the macro network to the LCIB's carrier. In particular, an LCIB's pilot beacon typically includes channels known as the pilot, paging, and sync channels. Thus, among the purposes of the LCIB's pilot beacon is to advertise the LCIB's carrier in the LCIB's coverage area, such that mobile stations can opt to tune to that carrier and communicate via the LCIB. As such, the LCIB transmits its pilot beacon on the one or more macro-network carriers in the surrounding area, and more particularly, on the forward-link component of each of those one or more macro-network carriers.

In particular, after an initial auto-configuration process, an LCIB will transmit either what is known as and referred to herein as a "fixed" pilot beacon, or what is known as and referred to herein as a "frequency-hopping" pilot beacon. If the one or more macro base stations in the surrounding area all operate on the same carrier, the LCIB will transmit its pilot beacon on only that carrier (i.e. a fixed pilot beacon). If, multiple carriers are provided by the surrounding macro network, however, the LCIB will cycle through those carriers, transmitting its pilot beacon on each macro-network carrier for a fixed period of time (i.e. a frequency-hopping pilot beacon), such as a few hundred milliseconds or one or two seconds. Thus, whether the LCIB transmits a fixed or frequency-hopping pilot beacon, the pilot beacon may interfere with macro-network communications that are taking place at the same time and on the same carrier.

Moreover, an LCIB is typically capable of maintaining a list of mobile stations that are authorized to register with it. In accordance with the invention, on power-up or restart, an LCIB may perform what is referred to here as a ranging function. The ranging function involves the LCIB starting with its pilot beacon off or at a very low power setting, and gradually increasing the power level on the one or more carriers (depending whether the pilot beacon is fixed or frequency-hopping) up to a certain power level, which may be determined based on whether the LCIB is operating in a restricted or non-restricted mode, to give nearby mobile stations an opportunity to register for service with the LCIB.

In the restricted mode, the LCIB may increase pilot-beacon power until an unauthorized mobile station—i.e. a mobile station that is not on the authorized list—tries to register with the LCIB. In that case, the LCIB may set the pilot-beacon power level to whatever the highest level was at which an authorized mobile station registered. In non-restricted mode, the LCIB may increase power during the ranging function as high as it is capable, or perhaps to some other upper bound set by a configurable parameter. And other possibilities exist as well.

The LCIB may carry out the ranging function in response to being powered on, restarted, or perhaps in response to some other trigger. In some embodiments, the LCIB may carry out the ranging function periodically, with certain limitations, as described below. In any event, there will be times when the ranging function does not result in any mobile stations registering with the LCIB. According to the invention, in this case, the LCIB will power its pilot beacon off or to a low-power setting, and begin monitoring the reverse-noise rise (RNR) on the one or more carriers on which it transmits its pilot beacon (when the pilot beacon is on).

In general, RNR is a known concept that essentially involves measuring an amount of reverse noise on a carrier and comparing the measured value with a stored baseline value, to determine how far the reverse-noise level has risen above that baseline level. At a certain point, the LCIB detects an RNR on a given carrier that exceeds an RNR threshold maintained by the LCIB. This RNR may well correspond to a nearby mobile station conducting a call on the macro network. In response to that detection, the LCIB begins gradually increasing its pilot-beacon power level on that carrier, to give the mobile station a chance to handoff to the LCIB.

While the LCIB is gradually increasing its pilot-beacon power level on the carrier, the LCIB also continues to monitor the RNR on that carrier. If the LCIB detects a sudden drop in the RNR (and perhaps also confirms that the call has not been handed off from the macro network to the LCIB itself), the LCIB will again turn its pilot-beacon power level off or to a low-power setting, and continue to monitor the RNR on that carrier. If the LCIB detects the RNR increasing again soon after the LCIB turned its pilot-beacon power down or off, the LCIB concludes that the pilot beacon was likely interfering with the macro-network call, such that the mobile station could no longer decode the forward link from the macro network, causing the mobile station to start its drop-call timer and power off its reverse-link transmissions.

At this point, while the LCIB may conclude that its pilot beacon was interfering, it may try once more (or twice more, etc.) to be sure. That is, the LCIB may again gradually increase its pilot-beacon power while continuing to monitor the RNR. If there is again a sudden drop (perhaps accompanied by confirming that the macro-network call has not been handed off from the macro network to the LCIB), the LCIB will again power the pilot-beacon down or off. If the RNR goes right back up again, the LCIB may then conclude that its pilot beacon is a source of interference for a macro-network call. Once the LCIB has made this conclusion, it may responsively power its pilot beacon off or to a low-power setting on that carrier. The LCIB may then continue to monitor the RNR on that carrier, and only increase its pilot-beacon power once the RNR has returned to a normal level, at which point the LCIB may responsively carry out the above-described ranging process.

Furthermore, in some embodiments, when the LCIB does have one or more mobile stations registered on it, the LCIB may periodically (e.g. once every thirty minutes) send requests to those mobile stations to re-register. If the LCIB does not receive any re-registration responses over a certain timeout period (e.g. two hours), the LCIB may power its pilot beacon off or down to a low-power setting, and then employ the approach described above, i.e. monitoring for an increase of the RNR above a certain threshold, and then gradually powering up the pilot beacon while evaluating whether that pilot beacon then causes macro-network interference. In general, this approach should tend to reduce and perhaps even eliminate interference with macro-network communications by LCIB pilot beacons that currently have no mobile stations registered thereon.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
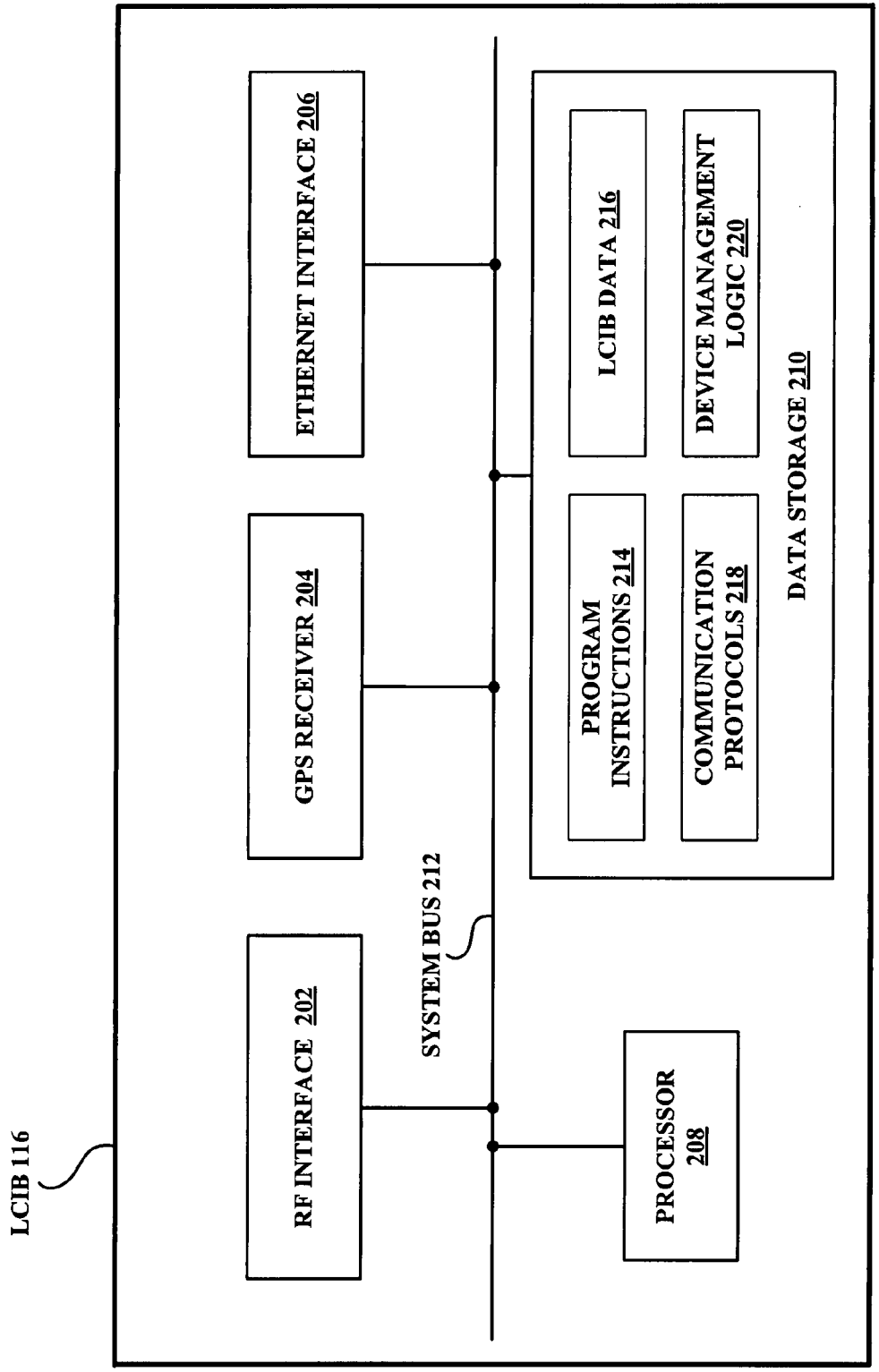
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
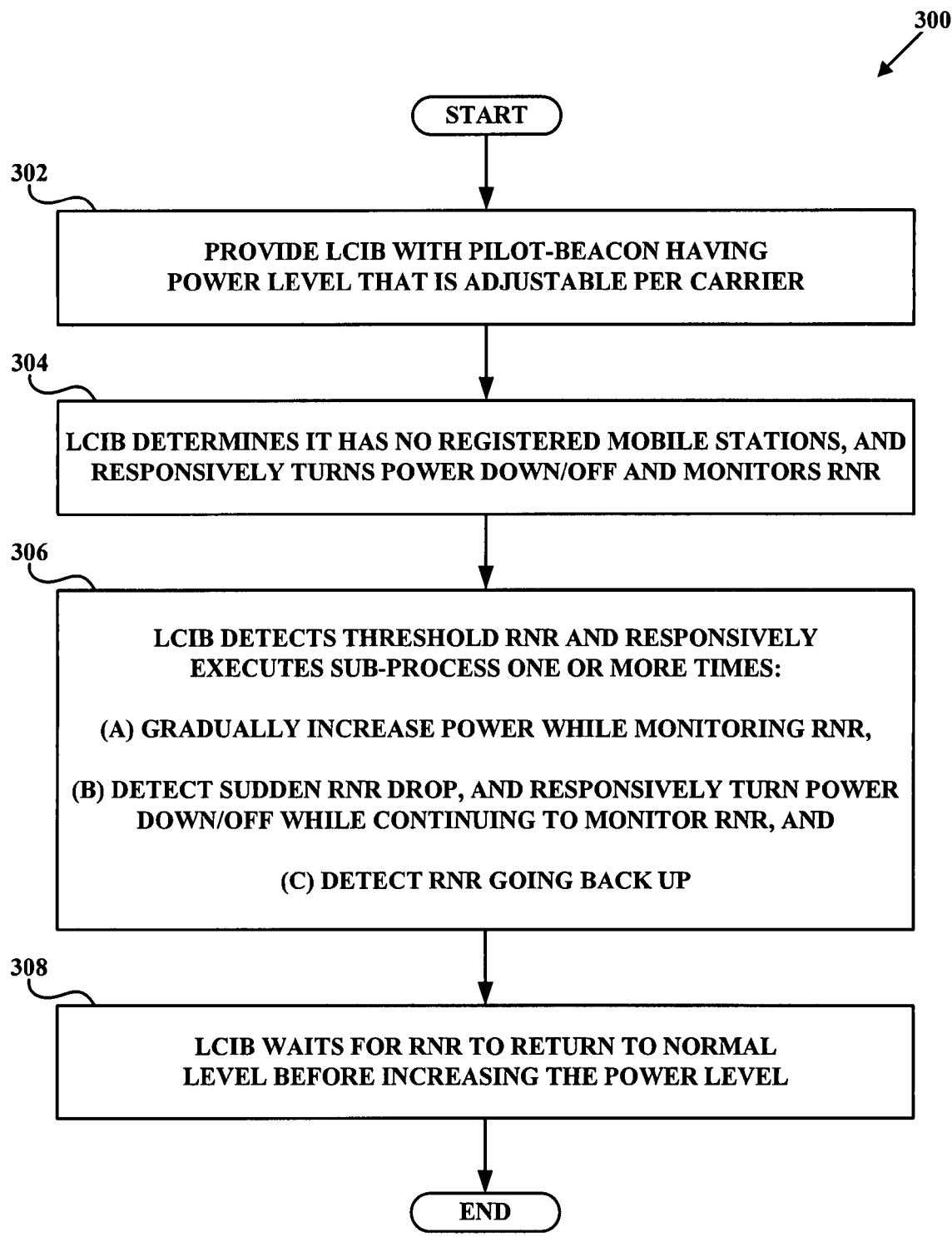
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 for an LCIB, such as LCIB 116 for instance, to reduce interference with communications between mobile stations and macro-network base stations, where each macro-network base station provides service on at least one carrier. As shown in FIG. 3, method 300 begins at step 302, when LCIB 116 is provided, where LCIB 116 transmits a pilot beacon on each carrier in a set of one or more carriers, and where the pilot beacon has a power level that is adjustable on a per-carrier basis. At step 304, LCIB 116 determines that it does not have any mobile stations registered on LCIB 116, and responsively (a) sets the power level to a first low-power setting on each carrier in the set and (b) monitors the RNR on each carrier in the set.

At step 306, while monitoring the RNR on a first carrier in the set, LCIB 116 detects that the RNR on the first carrier exceeds a first RNR threshold, and responsively carries out a sub-process a first number of times on the first carrier, where the sub-process comprises (a) gradually increasing the power level while continuing to monitor the RNR, (b) while gradually increasing the power level, detecting a decrease in the RNR that exceeds an RNR-decrease threshold, and responsively setting the power level to a second low-power setting while continuing to monitor the RNR, and (c) after setting the power level to the second low-power setting, detecting an increase in the RNR that exceeds an RNR-increase threshold. At step 308, after carrying out the sub-process the first number of times on the first carrier, the LCIB waits for the RNR on the first carrier to fall below a second RNR threshold before increasing the power level on the first carrier above the second low-power setting.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, or any other network element(s).

i. Provide LCIB

At step 302, LCIB 116 is provided. LCIB 116 transmits a pilot beacon on each carrier in a set of one or more carriers, and the pilot beacon has a power level that is adjustable on a per-carrier basis. As described above, the pilot beacon may comprise a pilot channel, a paging channel, and a sync channel, and in general may include information, such as a channel-list message, that aids mobile stations in handing off from macro-network carriers to LCIB 116's carrier. The set may include multiple carriers, and the pilot beacon may be a frequency-hopping pilot beacon that repeatedly cycles through each carrier in the set. In other cases, the set may include only one carrier, in which case the pilot beacon would be a fixed pilot beacon.

ii. Upon Having No Registered Mobile Stations, Turn Power Down/Off and Monitor RNR At step 304, LCIB 116 determines that it does not have any mobile stations registered thereon, and responsively (a) sets the pilot-beacon power level to a first low-power setting on each carrier in the set and (b) monitors RNR on each carrier in the set. Note that the first low-power setting could be zero, or could be some positive, low setting.

Prior to or as part of carrying out step 304, LCIB 116 may perform a ranging process on each carrier in the set. The ranging process may include a first phase and a second phase. The first phase may involve increasing the power level from a minimum value (such as zero or some low value) to a maximum value, while the second phase may involve setting the power level to an operating value on each carrier in the set based on whether any mobile stations register with LCIB 116 during the first phase. In some embodiments, the maximum value may be a power level at which at least one unauthorized mobile station is first detected during the ranging process. In other embodiments, the maximum value may be a stored upper bound.

In any event, LCIB 116 determining that it does not have any mobile stations registered thereon may involve LCIB 116 determining that no mobile stations registered with it during the first phase. Furthermore, LCIB 116 responsively setting the power level to the first low-power setting on each carrier in the set may involve LCIB 116 setting the operating value to the first low-power setting.

In some embodiments, when LCIB 116 does have at least one mobile station registered thereon, LCIB 116 may periodically (e.g. once every thirty minutes) request re-registration from each such mobile station. In those cases, LCIB 116 determining that it does not have any mobile stations registered thereon may involve LCIB 116 determining that no re-registrations have been received in a threshold amount of time, such as two hours.

With respect to monitoring RNR on each carrier in the set, LCIB 116 may store a baseline level of reverse-link noise, and monitoring the RNR on a given carrier may involve measuring a current level of reverse-link noise on the carrier and calculating the RNR on the given carrier as the difference between the current level of reverse-link noise on the given carrier and the baseline level of reverse-link noise. In some embodiments, storing the baseline level of reverse-link noise may involve periodically taking noise-level measurements on the reverse link of at least one carrier in the set, and periodically calculating the baseline level as the average of, e.g., the lowest 10% of the noise-level measurements taken in the previous 24 hours, though other percentages, timeframes, and variables in general could be used to arrive at a baseline.

iii. Detect Macro-Network Call and Check for Pilot-Beacon Interference

At step 306, while monitoring the RNR on a particular carrier in the set, LCIB 116 detects that the RNR on that carrier exceeds a first RNR threshold, and responsively carries out a sub-process a certain number of times (e.g. 1 or 2) on that carrier. The sub-process involves gradually (e.g. less rapidly than during the standard ranging process) increasing the pilot-beacon power level while continuing to monitor the RNR on the carrier.

The sub-process further involves, while gradually increasing the power level, detecting a decrease in the RNR on the carrier, where that decrease exceeds an RNR-decrease threshold, which may be in terms of decibels (dB), and may also involve a time component, such as checking whether the RNR decreases by a certain number of dB in a certain amount of time. This part of the sub-process may also involve detecting that a macro-network call that caused the RNR on the first carrier to exceed the first RNR threshold has not been handed off from the macro network to LCIB 116. (If the call had been handed off to LCIB 116, there would be no need to worry about interfering with that call.)

In any case, in response to detecting the sudden decrease in RNR (and perhaps lack of handoff of the macro-network call to LCIB 116), LCIB 116 sets the power level to a second low-power setting while continuing to monitor the RNR on the carrier. And the second low-power setting could be equal or not equal to the first low-power setting. As one example, the second low-power setting could be zero—i.e. LCIB 116 may turn off its pilot beacon on the carrier.

The sub-process further involves, after setting the power level to the second low-power setting, detecting an RNR increase that exceeds an RNR-increase threshold. As with the RNR-decrease threshold, the RNR-increase threshold may have a dB (i.e. amount-of-increase) component, as well as a time component. So, LCIB 116 may determine whether, after it turns the pilot beacon off or down, the RNR goes back up by a certain amount in a certain amount of time. If so, LCIB 116 may conclude that its pilot beacon is likely interfering with a macro-network call on that carrier. However, as stated, LCIB 116 may run the sub-process again (or several more times) to be sure. Note that LCIB 116 may conduct a similar approach on one or more other carriers in the set of carriers on which it transmits its pilot beacon.

iv. Waiting for RNR to Return to Normal Before Turning Pilot Beacon Back Up or Back on At step 308, after carrying out the sub-process one or more times on the particular carrier, LCIB 116 waits for the RNR on the particular carrier to fall below a second RNR threshold before increasing the power level on the first carrier above the second low-power setting. This second RNR threshold may correspond to a normal level of reverse noise on the carrier. That is, step 308 may involve waiting for the RNR on the carrier to return to normal prior to increasing the pilot-beacon power level on that carrier. In general, the first and second RNR thresholds may be the same or different values, without departing from the present invention. Furthermore, upon the RNR on the particular carrier falling below the second RNR threshold (e.g. returning to normal), LCIB 116 may carry out the ranging process, and this approach may start anew.

b. A Second Exemplary Method

Figure 4:
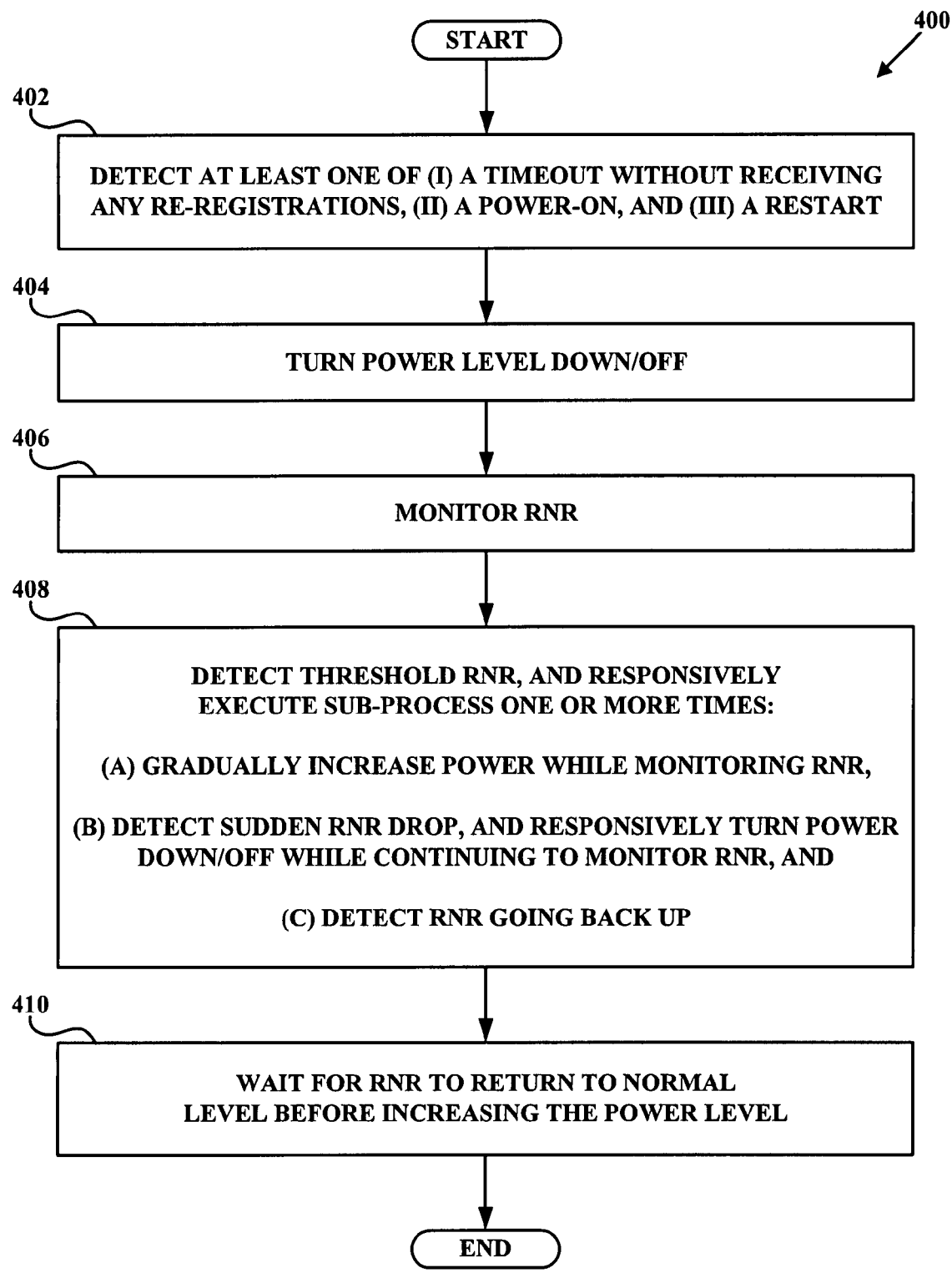
FIG. 4 is a flowchart of a method, in accordance with exemplary embodiments.

FIG. 4 is a flowchart of a second exemplary method, in accordance with an exemplary embodiment. In particular, FIG. 4 depicts a method 400 carried out by an LCIB having a pilot beacon that the LCIB transmits on each carrier in a set of one or more carriers, where the pilot beacon has a power level that is adjustable on a per-carrier basis. Note that method 400 may be carried out by an LCIB, such as LCIB 116, or perhaps by an LCIB in cooperation with one or more other entities, such as VPN terminator 120 and/or LCIB controller 122. Method 400 is similar in some respects to method 300, and thus is not described in as great of detail.

As shown in FIG. 4, method 400 begins at step 402, when LCIB 116 carries out a non-interference process (i.e. steps 404-410) in response to detecting at least one of the following triggers: (1) periodically requesting re-registration from each of a set of one or more mobile stations, and determining that no re-registrations have been received in a threshold amount of time, (2) being powered on, and (3) receiving a restart command. At step 404, LCIB 116 sets the pilot-beacon power level to a first low-power setting (e.g. zero) on each carrier in the set. At step 406, LCIB 116 monitors the RNR on each carrier in the set.

At step 408, while monitoring the RNR on a first carrier in the set, LCIB 116 detects that the RNR on the carrier exceeds a first RNR threshold, and responsively carries out a sub-process one or more times on the carrier. The sub-process comprises (i) gradually increasing the power level while continuing to monitor RNR, (ii) while gradually increasing the power level, detecting a decrease in the RNR that exceeds an RNR-decrease threshold (and perhaps also detecting that a macro-network call that caused the RNR on the carrier to exceed the first RNR threshold has not been handed off to LCIB 116), and responsively setting the power level to a second low-power setting while continuing to monitor the RNR, and (iii) after setting the power level to the second low-power setting, detecting an increase in the RNR that exceeds an RNR-increase threshold.

Finally, at step 410, after carrying out the sub-process one or more times on the carrier, LCIB 116 waits for the RNR on the carrier to fall below a second RNR threshold before increasing the power level on the carrier above the second low-power setting.

4. Conclusion

Various exemplary embodiments have been described above. Those skilled in the art will understand, however, that changes and modifications may be made to those examples without departing from the scope of the claims.

The invention claimed is:

1. A method for a low-cost Internet base station (LCIB) to reduce interference with communications between mobile stations and macro-network base stations, each macro-network base station providing service on at least one carrier, the method comprising:

provided an LCIB that transmits a pilot beacon on each carrier in a set of one or more carriers, the pilot beacon having a power level that is adjustable on a per-carrier basis;

the LCIB determining that it does not have any mobile stations registered thereon, and responsively (a) setting the power level to a first low-power setting on each carrier in the set and (b) monitoring a reverse-noise rise (RNR) on each carrier in the set;

while monitoring the RNR on a first carrier in the set, the LCIB detecting that the RNR on the first carrier exceeds a first RNR threshold, and responsively carrying out a sub-process a first number of times on the first carrier, the sub-process comprising:
  (a) gradually increasing the power level while continuing to monitor the RNR,
  (b) while gradually increasing the power level, detecting a decrease in the RNR that exceeds an RNR-decrease threshold, and responsively setting the power level to a second low-power setting while continuing to monitor the RNR, and
  (c) after setting the power level to the second low-power setting, detecting an increase in the RNR that exceeds an RNR-increase threshold; and after carrying out the sub-process the first number of times on the first carrier, the LCIB waiting for the RNR on the first carrier to fall below a second RNR threshold before increasing the power level on the first carrier above the second low-power setting.

2. The method of claim 1, wherein the pilot beacon comprises a pilot channel, a paging channel, and a sync channel.

3. The method of claim 1, wherein the set comprises multiple carriers, and wherein the pilot beacon is a frequency-hopping pilot beacon that repeatedly cycles through each carrier in the set.

4. The method of claim 3, further comprising:
while monitoring the RNR on a second carrier in the set, the LCIB detecting that the RNR on the second carrier exceeds the first RNR threshold, and responsively carrying out the sub-process the first number of times on the second carrier; and
after carrying out the sub-process the first number of times on the second carrier, the LCIB waiting for the RNR on the second carrier to fall below the second RNR threshold before increasing the power level on the second carrier above the second low-power setting.

5. The method of claim 1, further comprising:
the LCIB performing a ranging process on each carrier in the set, the ranging process comprising a first phase and a second phase, the first phase comprising increasing the power level from a minimum value to a maximum value, the second phase comprising setting the power level to an operating value on each carrier in the set based on whether any mobile stations register with the LCIB during the first phase.

6. The method of claim 5, wherein the maximum value is selected from the group consisting of (a) a power level at which at least one unauthorized mobile station is first detected during the ranging process and (b) a stored upper bound for the ranging process.

7. The method of claim 5, wherein the LCIB determining that it does not have any mobile stations registered thereon comprises the LCIB determining that no mobile stations registered with the LCIB during the first phase, and wherein responsively setting the power level to the first low-power setting on each carrier in the set comprises setting the operating value to the first low-power setting.

8. The method of claim 5, wherein increasing the power level on the first carrier above the second low-power setting comprises performing the ranging process.

9. The method of claim 1, wherein the first low-power setting is equal to the second low-power setting.

10. The method of claim 1, wherein the first low-power setting is not equal to the second low-power setting.

11. The method of claim 1, wherein at least one of the first low-power setting and the second low-power setting corresponds to a zero-power setting.

12. The method of claim 1, further comprising the LCIB storing a baseline level of reverse-link noise, wherein monitoring the RNR on a given carrier comprises:
measuring a current level of reverse-link noise on the given carrier; and
calculating the RNR on the given carrier as the difference between the current level of reverse-link noise on the given carrier and the baseline level of reverse-link noise.

13. The method of claim 12, wherein storing the baseline level of reverse-link noise comprises:
periodically taking noise-level measurements on the reverse link of at least one carrier in the set; and
periodically calculating the baseline level as the average of the lowest X % of the noise-level measurements taken in the previous Y hours.

14. The method of claim 13, wherein X equals 10, and wherein Y equals 24.

15. The method of claim 1, wherein the first RNR threshold is equal to the second RNR threshold.

16. The method of claim 1, wherein the first number is 1 or 2.

17. The method of claim 1, further comprising:
determining that a first macro-network communication session caused the RNR on the first carrier to exceed the first RNR threshold,
wherein detecting the decrease in the RNR that exceeds the RNR-decrease threshold comprises confirming that the first macro-network communication session has not been handed off to the LCIB.

18. The method of claim 1, further comprising:
the LCIB periodically requesting re-registration from each of a set of one or more mobile stations, wherein the LCIB determining that it does not have any mobile stations registered thereon comprises the LCIB determining that no re-registrations have been received in a threshold amount of time.

19. A low-cost Internet base station (LCIB) for reducing interference with communications between mobile stations and macro-network base stations, each macro-network base station providing service on at least one carrier, the LCIB comprising:
a communication interface;
a processor; and
data storage comprising instructions executable by the processor to:
  transmit a pilot beacon on each carrier in a set of one or more carriers, the pilot beacon having a power level that is adjustable on a per-carrier basis;
  determine that the LCIB does not have any mobile stations registered thereon, and responsively (a) set the power level to a first low-power setting on each carrier in the set and (b) monitor a reverse-noise rise (RNR) on each carrier in the set;
  while monitoring the RNR on a first carrier in the set, detect that the RNR on the first carrier exceeds a first RNR threshold, and responsively carry out a sub-process a first number of times on the first carrier, the sub-process comprising:
    (a) gradually increasing the power level while continuing to monitor the RNR, (b) while gradually increasing the power level, detect a decrease in the RNR that exceeds an RNR-decrease threshold, and responsively set the power level to a second low-power setting while continuing to monitor the RNR, and (c) after setting the power level to the second low-power setting, detect an increase in the RNR that exceeds an RNR-increase threshold; and after carrying out the sub-process the first number of times on the first carrier, wait for the RNR on the first carrier to fall below a second RNR threshold before increasing the power level on the first carrier above the second low-power setting.

20. A method carried out by a low-cost Internet base station (LCIB) having a pilot beacon that the LCIB transmits on each carrier in a set of one or more carriers, the pilot beacon having a power level that is adjustable on a per-carrier basis, the method comprising the LCIB:

carrying out a non-interference process in response to at least one of the following triggers: (1) periodically requesting re-registration from each of a set of one or more mobile stations, and determining that no re-registrations have been received in a threshold amount of time, (2) being powered on, and (3) receiving a restart command, the non-interference process comprising:

(a) setting the power level to a first low-power setting on each carrier in the set;

(b) monitoring a reverse-noise rise (RNR) on each carrier in the set;

(c) while monitoring the RNR on a first carrier in the set, detecting that the RNR on the first carrier exceeds a first RNR threshold, and responsively carrying out a sub-process a first number of times on the first carrier, the sub-process comprising:

(i) gradually increasing the power level while continuing to monitor the RNR, (ii) while gradually increasing the power level, detecting a decrease in the RNR that exceeds an RNR-decrease threshold, and responsively setting the power level to a second low-power setting while continuing to monitor the RNR, and (iii) after setting the power level to the second low-power setting, detecting an increase in the RNR that exceeds an RNR-increase threshold; and (d) after carrying out the sub-process the first number of times on the first carrier, waiting for the RNR on the first carrier to fall below a second RNR threshold before increasing the power level on the first carrier above the second low-power setting.

* * * * *